US010906144B2

(12) United States Patent
Gally et al.

(10) Patent No.: US 10,906,144 B2
(45) Date of Patent: Feb. 2, 2021

(54) TOOL AND METHOD FOR CONNECTING/DISCONNECTING A RUNNER TO/FROM A SHAFT ASSEMBLY

(71) Applicant: GE RENEWABLE TECHNOLOGIES, Grenoble (FR)

(72) Inventors: Christophe Gally, Echirolles (FR); Patrick Loguier, Fontaine (FR); Cédric Jezequel, Theys (FR); Ludovic Achard, Veurey-Voroize (FR)

(73) Assignee: GE Renewable Technologies, Grenoble (FR)

( * ) Notice: Subject to any disclaimer, the term of this patent is extended or adjusted under 35 U.S.C. 154(b) by 104 days.

(21) Appl. No.: 16/062,285

(22) PCT Filed: Dec. 12, 2016

(86) PCT No.: PCT/EP2016/080566
§ 371 (c)(1),
(2) Date: Jun. 14, 2018

(87) PCT Pub. No.: WO2017/102616
PCT Pub. Date: Jun. 22, 2017

(65) Prior Publication Data
US 2018/0361520 A1    Dec. 20, 2018

(30) Foreign Application Priority Data

Dec. 14, 2015    (EP) ................................ 15290309

(51) Int. Cl.
*B23P 19/08*        (2006.01)
*F03B 3/12*         (2006.01)
(Continued)

(52) U.S. Cl.
CPC ............. *B23P 19/08* (2013.01); *B23P 19/006* (2013.01); *B23P 19/04* (2013.01); *F03B 3/128* (2013.01);
(Continued)

(58) Field of Classification Search
CPC ......... B23P 19/08; B23P 19/006; B23P 19/04; F03B 3/128; F03B 11/00; F05B 2230/60;
(Continued)

(56) References Cited

U.S. PATENT DOCUMENTS 8,931,153 B1 * 1/2015 Kimminau ............... B25B 13/48
29/255
2012/0122041 A1 * 5/2012 Billy ....................... F21V 35/00
431/2

FOREIGN PATENT DOCUMENTS

DE          690 432 C      4/1940
JP          S56-167863 A   12/1981
(Continued)

OTHER PUBLICATIONS

Machine Translation of JPS58144668a. Aug. 29, 1983. Method and device for dismantling and assembling runner for rotary hyrdaulic machine. Nakano Kenrou.*

(Continued)

*Primary Examiner* — David P Bryant
*Assistant Examiner* — Nirvana Deonauth
(74) *Attorney, Agent, or Firm* — Dority & Manning, P.A.

(57) ABSTRACT

The present invention generally relates to an innovative tool for connecting or disconnecting a runner to/from a shaft assembly. Moreover, the present invention relates to a method for carrying out such operations using the tool. Advantageously, connecting/disconnecting operations can occur without having to work under a suspended load, as the (Continued)

tool may be activated for supporting the runner remotely from a location outside a runner footprint.

8 Claims, 8 Drawing Sheets

(51) Int. Cl.
*F03B 11/00* (2006.01)
*B23P 19/04* (2006.01)
*B23P 19/00* (2006.01)

(52) U.S. Cl.
CPC ........... *F03B 11/00* (2013.01); *F05B 2230/60* (2013.01); *F05B 2230/61* (2013.01); *Y02E 10/20* (2013.01); *Y02P 70/50* (2015.11)

(58) Field of Classification Search
CPC .. F05B 2230/61; Y02P 70/525; Y02E 10/223; Y02E 10/226
See application file for complete search history.

(56) References Cited

FOREIGN PATENT DOCUMENTS

| JP | S58-5481 A | | 1/1983 | |
|----|----|----|----|----|
| JP | S58144668 A | * | 8/1983 | ............. F03B 11/00 |
| JP | S61-226570 A | | 10/1986 | |
| JP | S61-286586 A | | 12/1986 | |

OTHER PUBLICATIONS

Nakano Kenrou. "Method and Device for Dismantling and Assembling Runner for Rotary Hydraulic Machine". JPS58144668A. 1983.*
European Search Report Corresponding to EP15290309.2 dated May 27, 2016.
PCT International Search Report Corresponding to PCT/EP2016/080566 dated Feb. 13, 2017.

* cited by examiner

TOOL AND METHOD FOR CONNECTING/DISCONNECTING A RUNNER TO/FROM A SHAFT ASSEMBLY

TECHNICAL FIELD

The present invention generally relates to an innovative tool for connecting or disconnecting a runner to/from a shaft assembly. Moreover, the present invention relates to a method for carrying out such operations using the tool.

BACKGROUND

As well known, assembling or disassembling operations which are performed under a suspended load put the safety of workers at risk and should be always avoided, as a serious hazard is presented.

More in detail, it is herewith referred to the operations of connecting/disconnecting a runner to a shaft assembly.

At present, different solutions to this problem have been developed and are currently used.

Figure 1:
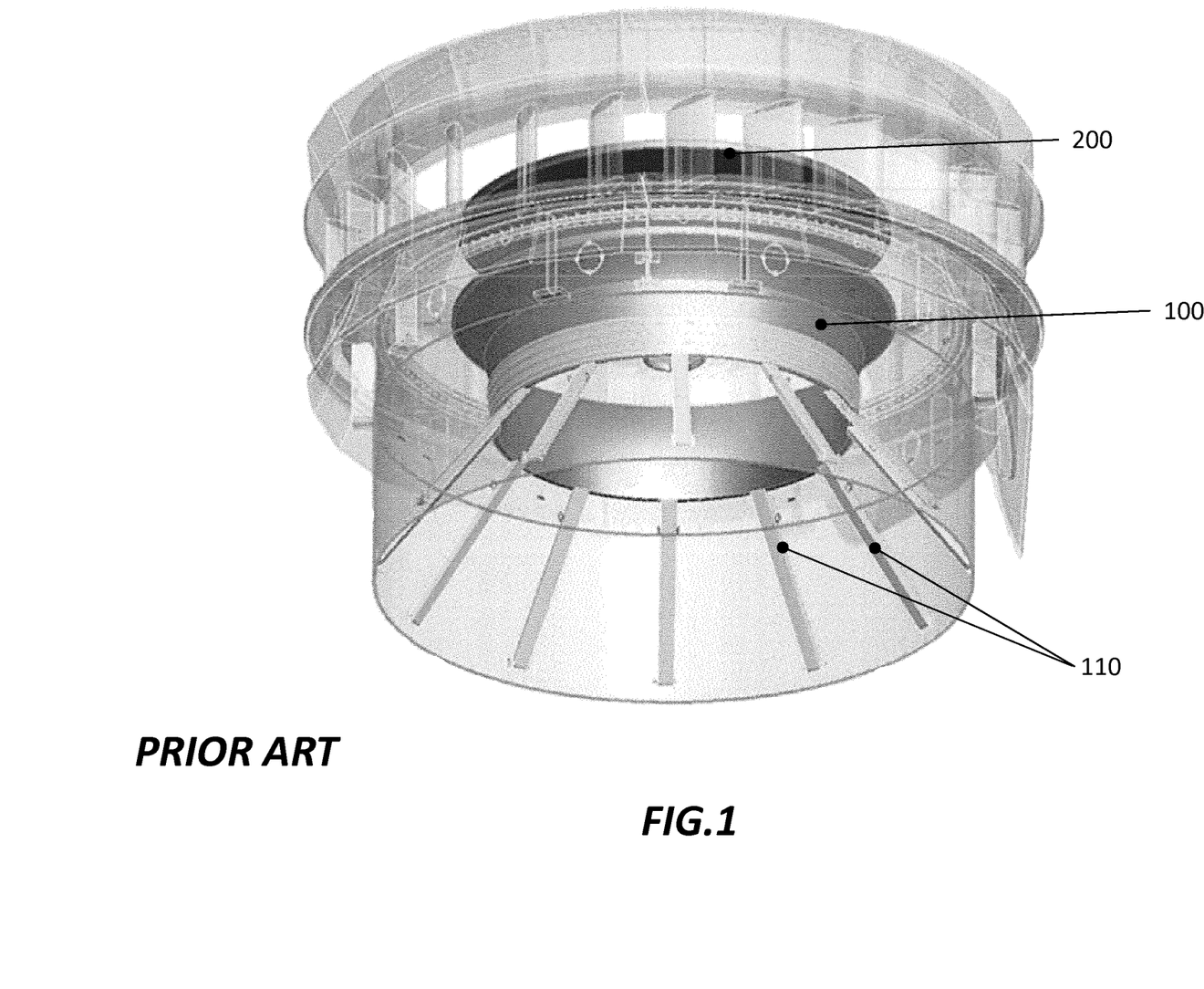
FIGS. 1 and 2 show an arrangement for supporting a runner during coupling/decoupling operations according to the prior art.
Figure 2:
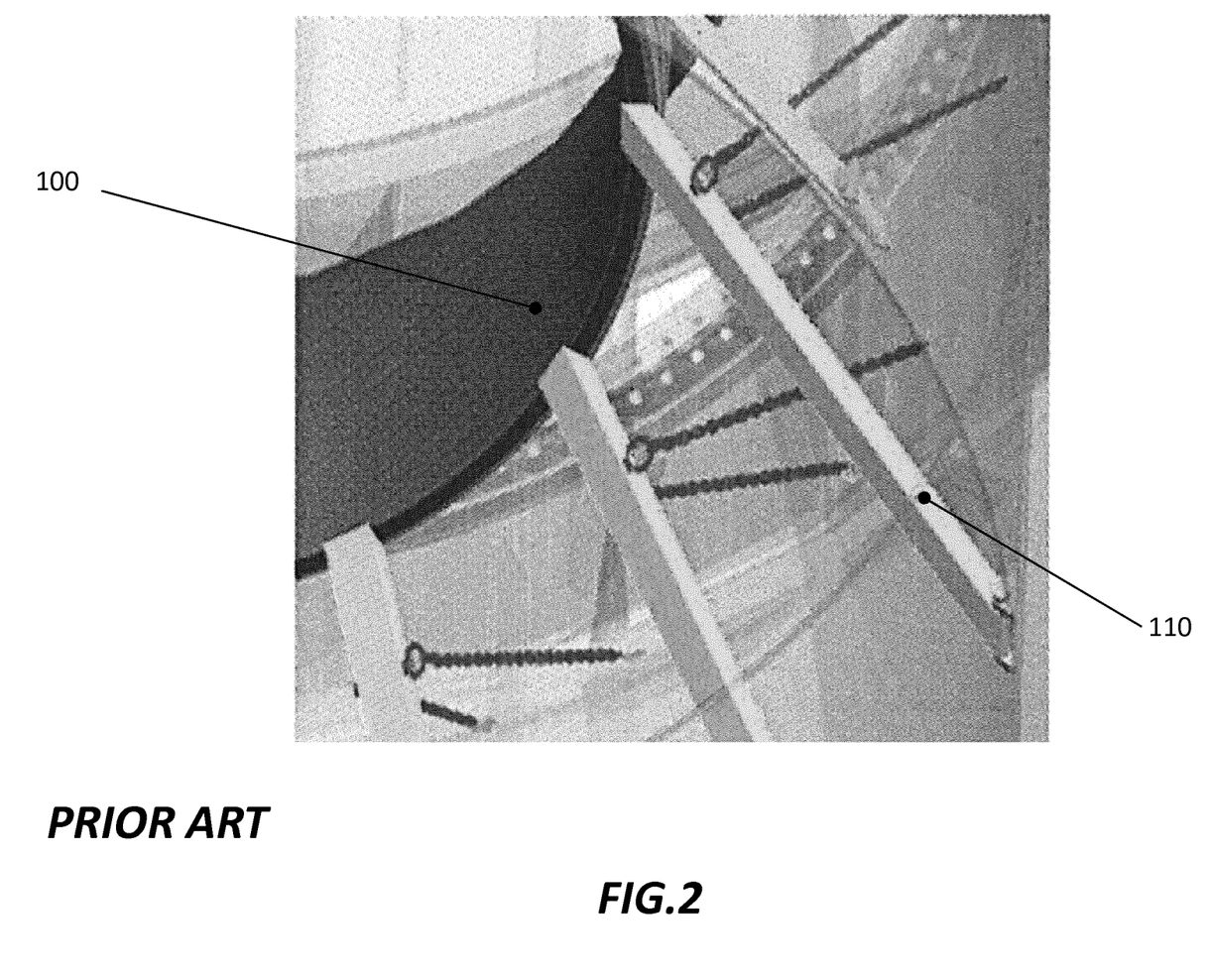

As an example, with reference to FIGS. 1 and 2, a runner 100 is being connected/disconnected to a shaft assembly 200, more in particular to a flange in turn connected to the rotatable shaft (not shown).

During the coupling/decoupling operations, runner 100 is supported through a plurality of beams 110.

However, such solution as it can be clearly seen from the figures proves to be difficult to implement, time consuming and certainly expensive.

In other arrangements, which for example use hydraulic columns for supporting the runner, there is work carried out while the load is still suspended.

SUMMARY OF THE INVENTION

It is an object of the present invention to solve the aforementioned technical problems by providing a tool for connecting/disconnecting a runner to/from a shaft assembly having one or more of the features defined in independent claim 1.

It is a further object of the present invention to provide a method for connecting/disconnecting a runner to/from a shaft assembly having one or more of the features defined in dependent claim 11.

According to an aspect of the invention, this object is obtained by a tool for connecting/disconnecting a runner to/from a shaft assembly, the tool having an elongated shape. The tool may comprise on a first portion reversible connecting means which may be configured to couple the tool to the shaft assembly. The tool may further comprise on a second portion an engaging-element and/or a driving system associated thereto. The driving system may be operable from a remote location which may be outside a footprint of the runner and may be adapted to activate the tool by positioning the engaging-element into an operative outward configuration such to support the runner.

According to an embodiment of the invention, the reversible connecting means is a thread located on the first portion adapted to be coupled to a complementary receiving threaded seat located on the runner.

According to an embodiment of the invention, the engaging-element comprises a couple of hooks hinged on the tool.

According to an embodiment of the invention, the couple of hooks share a common pivot and are provided with torsion springs.

According to an embodiment of the invention, the torsion springs are adapted to maintain the couple of hooks in an idle inward configuration.

According to an embodiment of the invention, the driving system comprises a reciprocatable latch disposed along the tool and connected to a cable operable from the remote location, the latch being adapted to cooperate with the couple of hooks in order to position the engaging element into the outward operative configuration.

According to an embodiment of the invention, the latch is movable between a retracted position and an extended position.

According to an embodiment of the invention, the latch comprises an upper portion adapted to be inserted, when in the extended position, between the hooks such to displace them into the outward operative configuration.

According to an embodiment of the invention, the latch comprises a reaction spring such that it is idle when in the extended position and it is pulled down by means of the cable to reach the retracted position.

According to an embodiment of the invention, the upper portion is arrow-shaped.

According to another embodiment of the invention, it is also provided a method for connecting a runner to a shaft assembly. The runner and the shaft assembly may comprise respective threaded seats. The method in an embodiment comprises one or more of the steps of:

inserting at least three tools in equidistant threaded seats of the shaft assembly;

lifting the runner until it contacts the shaft assembly;

activating the engaging elements of each of the tools to support the runner by operating the respective driving systems from remote locations outside a runner footprint;

inserting connecting bolts for all aligned threaded seats.

According to an embodiment of the invention, the method further includes the steps of removing the three tools and replacing them with bolts.

According to another embodiment of the invention, it is also provided a method for disconnecting a runner from a shaft assembly. The runner and the shaft assembly may comprise respective threaded seats connected by bolts. The method may comprise one or more of the steps of:

removing at least three bolts positioned in equidistant aligned threaded seats of the shaft assembly and runner;

replacing each of the three bolts with respective tools;

activating the engaging elements of each of the tools to support the runner by operating the respective driving systems from remote locations outside a runner footprint;

removing bolts from their respective threaded seats;

disconnecting the runner from the shaft assembly.

BRIEF DESCRIPTION OF THE DRAWINGS

The objects, advantages and other features of the present invention will become more apparent upon reading of the following non-restrictive description of embodiments thereof, given for the purpose of exemplification only, with reference to the accompany drawing, through which similar reference numerals may be used to refer to similar elements, and in which.

An exemplary embodiment will be now described with reference to the aforementioned drawings.

DETAILED DESCRIPTION OF THE INVENTION

Figure 3:
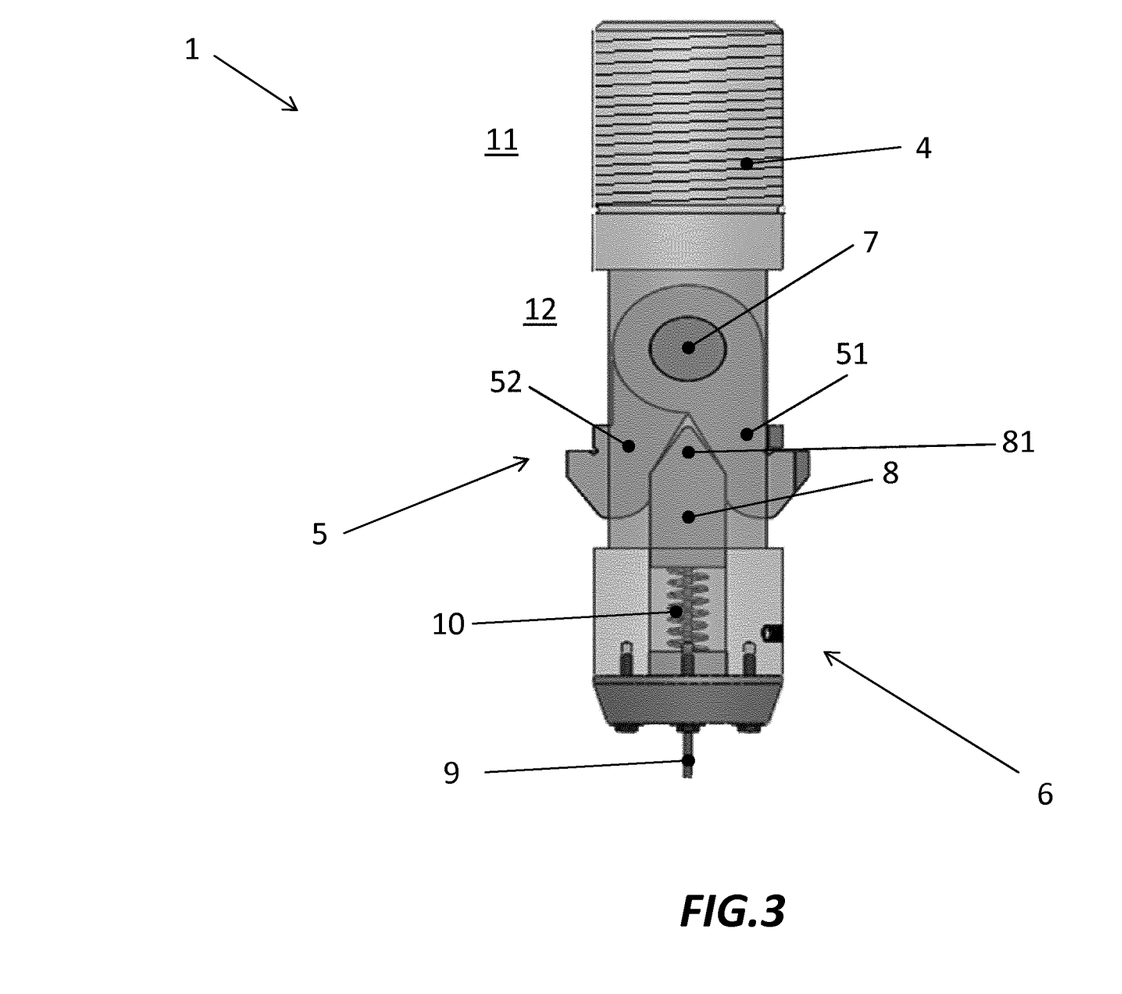
FIG. 3 shows a front view of a tool when positioned in an operative configuration according to the present invention.

With reference to FIG. 3 it is shown a tool according to the present invention, generally indicated with numeral reference 1. Tool 1 may be used, as it will be clear from the detailed description of an embodiment and non-limiting embodiment, for connecting/disconnecting a runner to/from a shaft assembly.

As shown, tool 1 has an elongated shape and comprises a first portion 11 and a second portion 12. Reversible connecting means 4 is located on the first portion 11. In this embodiment, reversible connecting means is in the form of a thread 4, which is adapted to be coupled to a complementary receiving thread seat which is located into the shaft assembly (not shown). Reversible connecting means 4 is configured to couple the tool 1 to the shaft assembly (not shown). Tool 1 further comprises, on its second portion 12, an engaging element 5 and a driving system 6 associated thereto.

The engaging element 5 includes a couple of hooks 51, 52 which are hinged on the tool 1 by means of a common pivot 7. Furthermore, hooks 51, 52 are provided with torsion springs (not visible).

The driving system 6 comprises a reciprocatable latch 8 which is disposed along the tool 1 and connected to a cable 9 which is operable from a remote location (not shown). Latch 8 is movable between a retracted position (not shown) and an extended position (depicted in FIG. 4).

As shown in FIG. 3, when the latch 8 is in its extended position, its upper portion 81 is adapted to be inserted between hooks 51, 52 such to displace them in an outward operative configuration.

Differently, when the latch 8 is positioned in the retracted position, it does not interfere with the engaging element 5 (not shown). Torsion springs are arranged to maintain hooks 51, 52 in an idle inward configuration, such that the outward configuration is achieved by means of the latch 8 which pushes the hooks 51, 52 against the reaction of the torsion springs.

The driving system 6 further includes a reaction spring 10 associated to the latch 8 and arranged such that latch 8 is idle when in the extended position (depicted in FIG. 3) and it is pulled down by means of cable 9 against the reaction of spring 10 to reach the retracted position.

In an embodiment, upper portion 81 of the latch 8 is arrow-shaped.

With reference to the next FIGS. 4 and 5, it will be described in detail a method for connecting a runner to a shaft assembly using the tool 1 above described.

Figure 4:
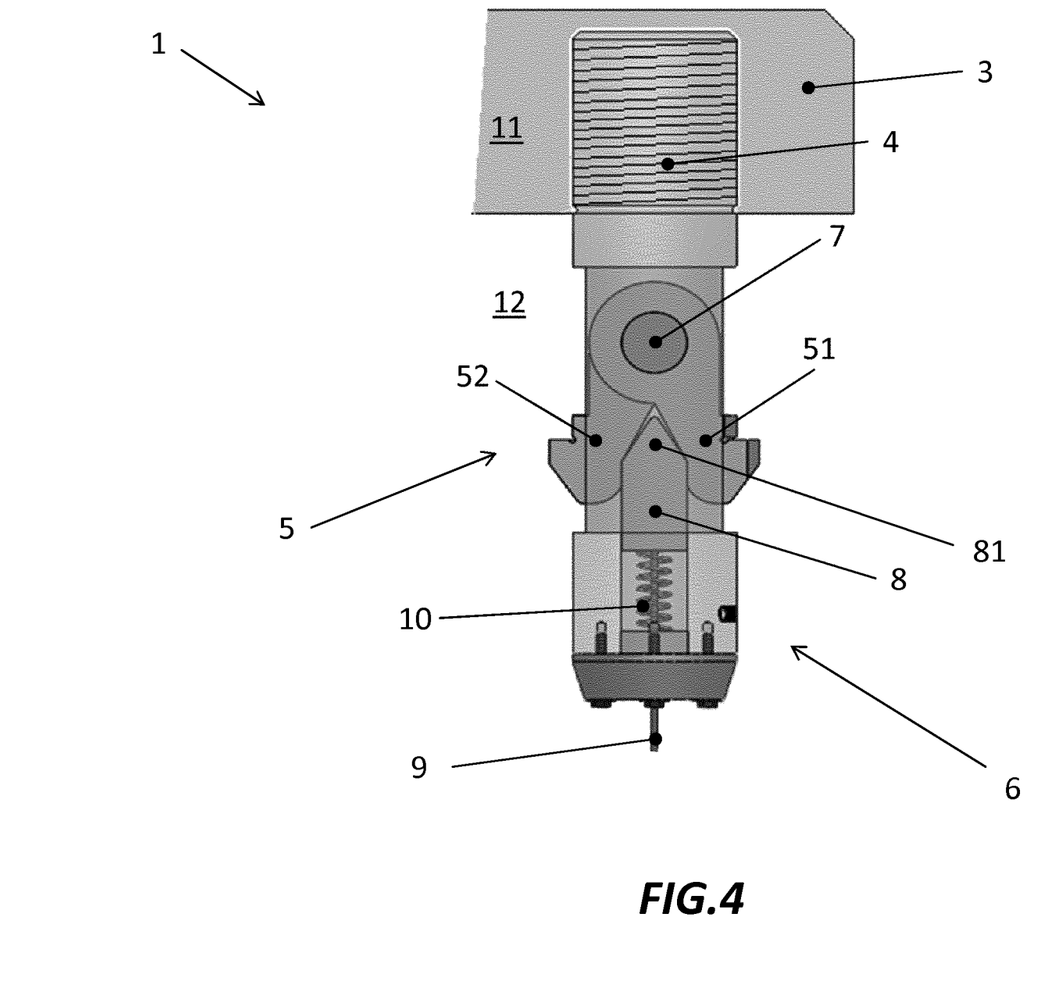
FIGS. 4 and 5 show a sequence of operations for connecting a runner to a shaft assembly using the tool according to the present invention.

In particular, with reference to FIG. 4, upper portion 11 of the tool 1 is firstly screwed in a threaded seat of a shaft assembly, the shaft assembly being generally indicated with numeral reference 3.

With the shaft assembly is typically intended a flange element integrally connected to a rotatable shaft, to which the runner has to be coupled.

In an embodiment, at least three tools are inserted in respective equidistant threaded seats located around the flange. The seats are usually arranged substantially along a circular line.

Figure 5A:
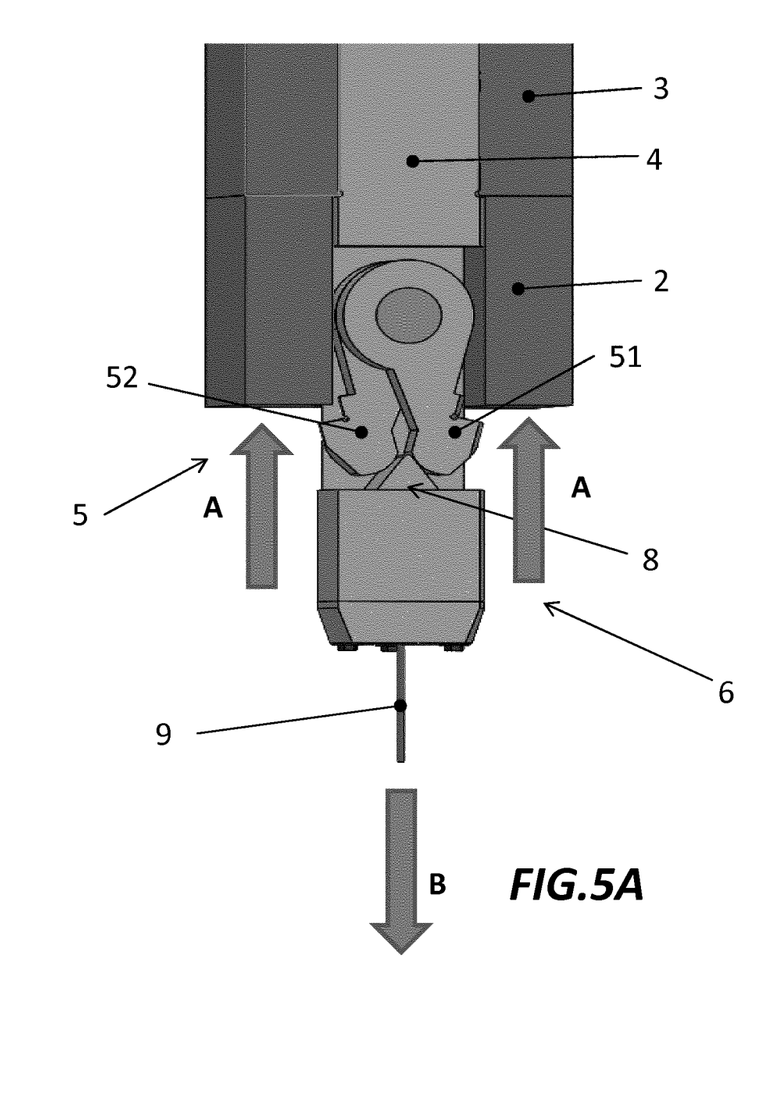

Subsequently, with reference to next FIG. 5A, a runner 2 is lifted (along direction of arrows A), ensuring that all the respective seats are aligned, until it contacts the flange.

For the correct positioning of the runner, the cables 9 of the tools 1 are pulled down (along direction of arrow B) such that latch 8 is positioned in the retracted position and, consequently, hooks 51, 52 are in the idle inward configuration to allow the upward transition of the runner 2.

Figure 5B:
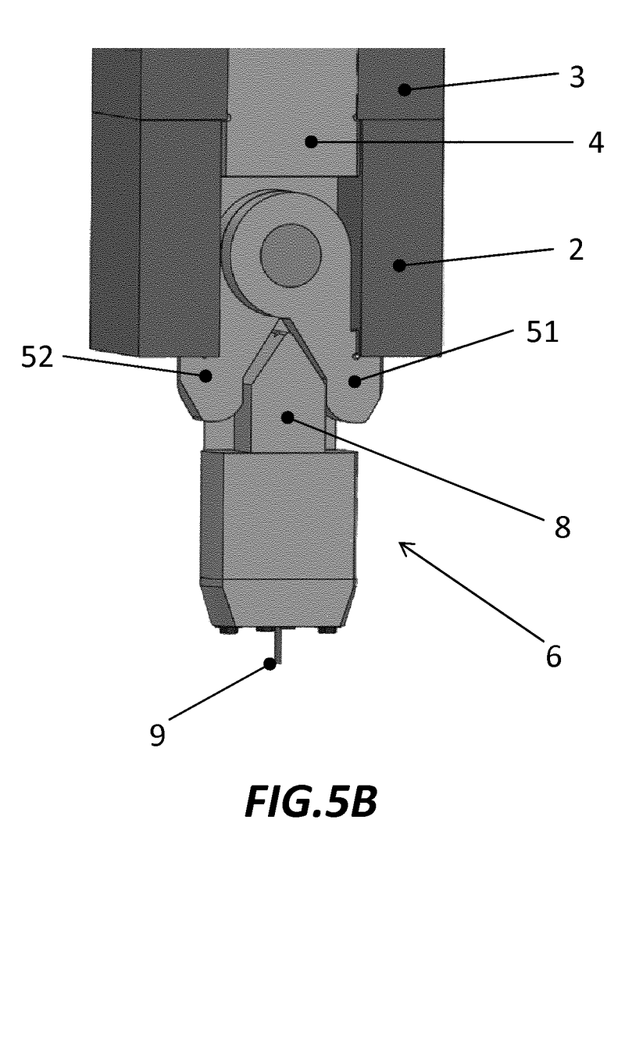

At this point, from a remote location, the engaging elements 5 of the tools 1 may be activated by operating the respective driving systems 6. More in particular, as shown in FIG. 5B, for each tool 1 the cable 9 is released such that latch 8 moves towards the extended configuration and cooperates with hooks 51, 52. This way, engaging element 5 is positioned in an operative outward configuration and supports the runner 2.

While the runner is supported by the three tools 1, connecting bolts can be inserted for all the aligned threaded seats.

As a final step, tools 1 can be unscrewed from the respective threaded seats and replaced with bolts.

Figure 6:
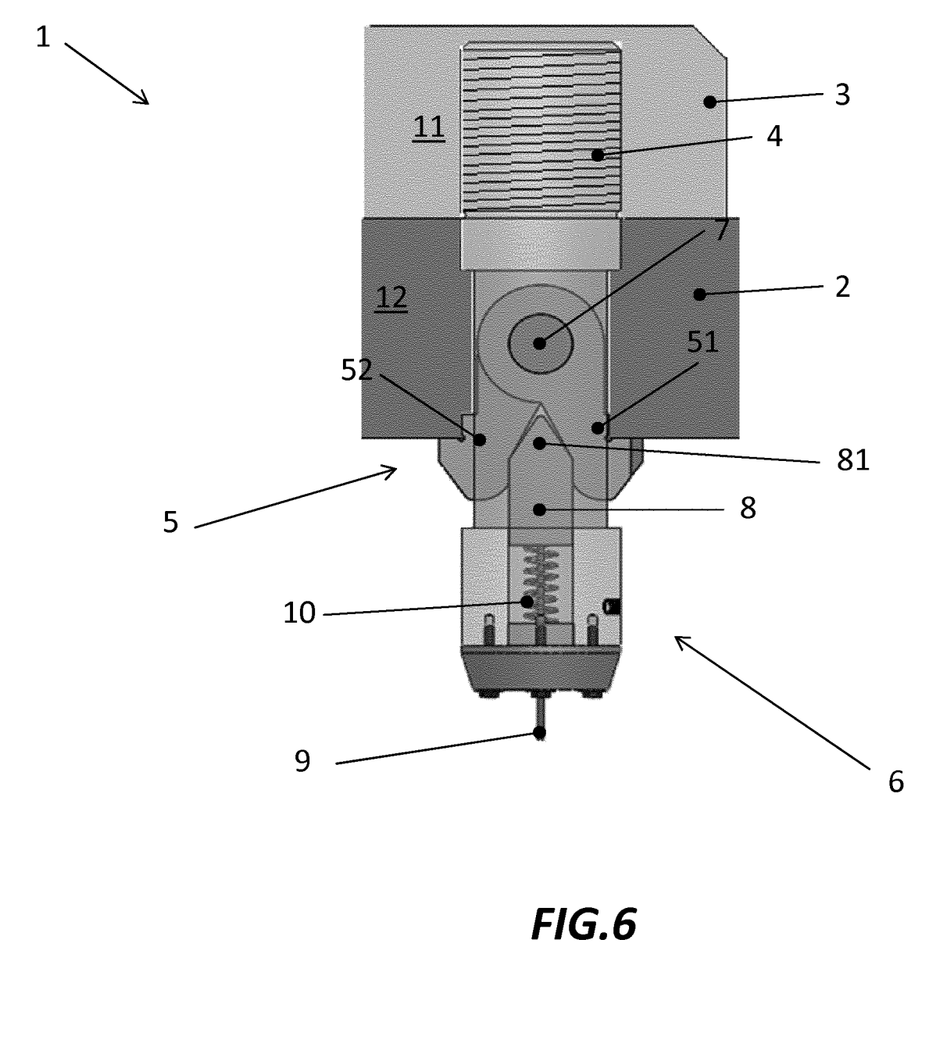
FIGS. 6 and 7 show a sequence of operations for disconnecting a runner to a shaft assembly using the tool according to the present invention.
Figure 7A:
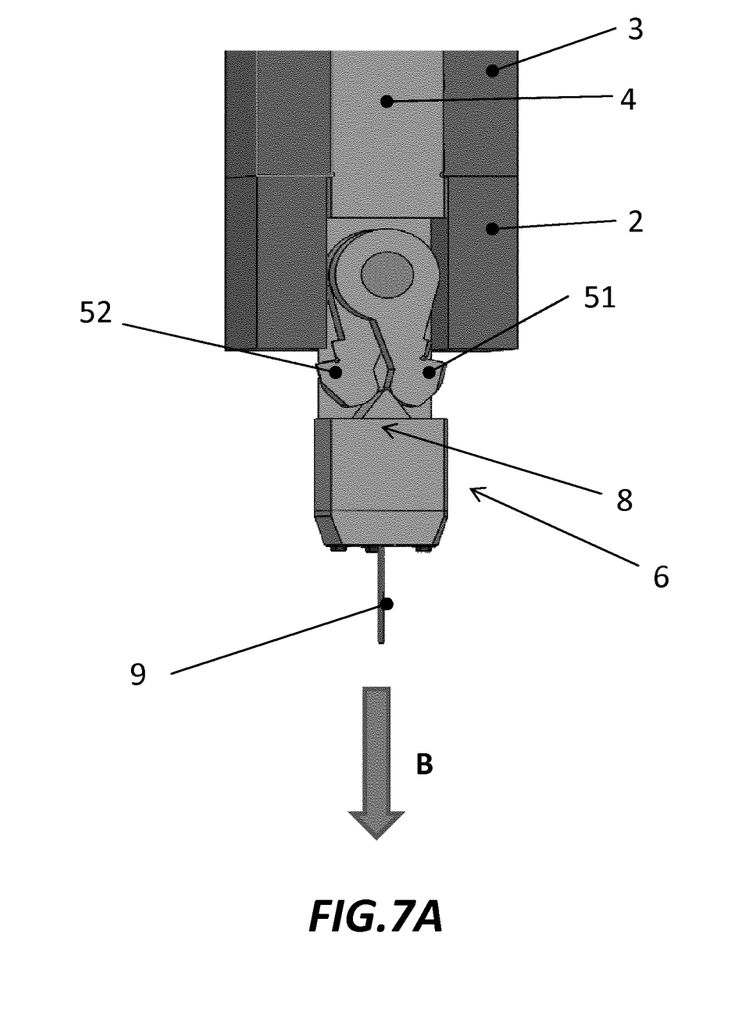
Figure 7B:
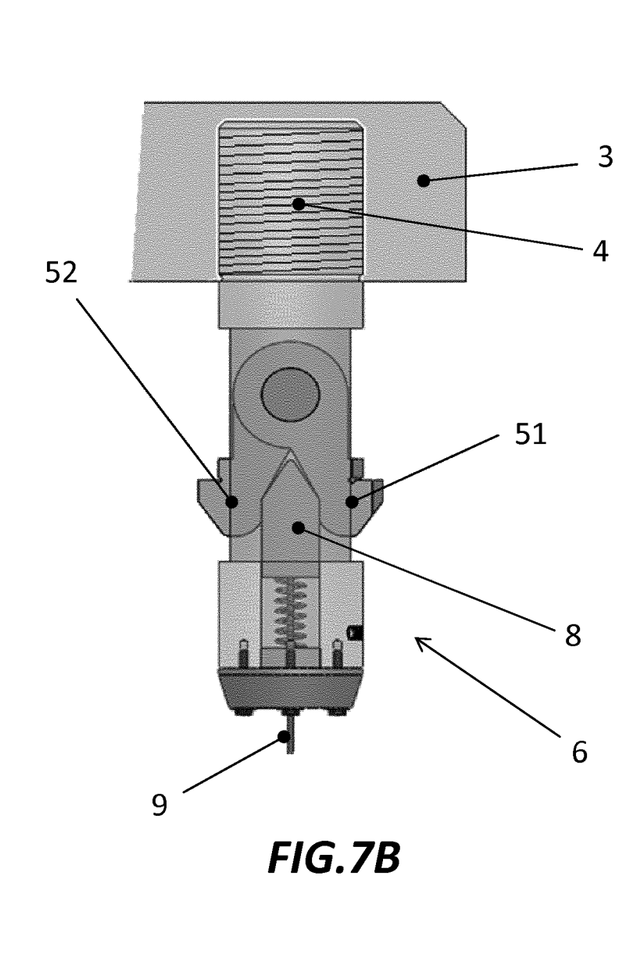

Making now reference to next FIGS. 6, 7A and 7B, it is described a method for disconnecting the runner 2 from the shaft assembly 3, wherein the runner 2 and the shaft assembly 3 are connected by bolts inserted into correspondent threaded seats.

The method includes the steps of removing at least three bolts positioned in equidistant aligned seats and replacing them with three tools 1 according to the invention.

As shown in FIG. 6, the tool 1 has been inserted and connected to the flange 3 through its reversible connecting means 4 located on upper portion 11.

In such configuration, the engaging element 5 is activated, having the latch 8 normally in the extended position and thus pushing the hooks 51, 52 outwards.

Therefore, it will be appreciated that the tools 1 support the runner 2 and then all the bolts may be removed from their respective threaded seats in safety without this causing the runner 2 to fall.

Next, with reference to FIGS. 7A and 7B, the cables 9 of tools 1 are pulled down (along direction of arrow B) from a remote location to allow the disconnection of the runner 2, as the latch 8 is dragged into the retracted position and consequently the hooks 52, 52 move towards the inward configuration.

Figure 8:
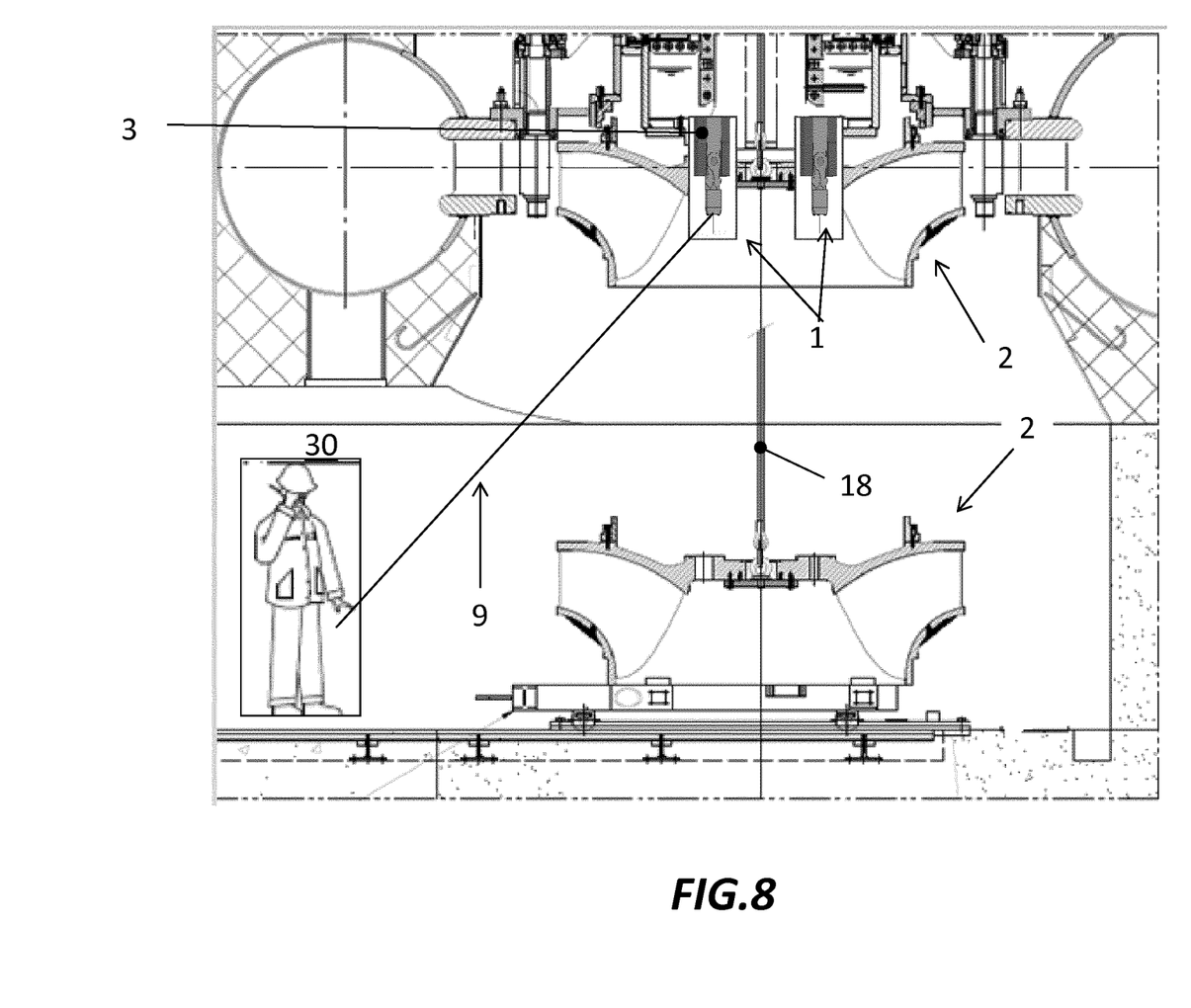
FIG. 8 show an overall schematic view of the connecting/disconnecting operations conducted by a worker.

Making now reference to last FIG. 8, it is generally illustrated the operation of connecting/disconnecting the runner 2 to/from the shaft assembly 3.

For connecting operations, runner 2 is lifted with the aid of a sling 18 until it reaches the summit where it is put adjacent to the flange 3 of the shaft. In at least three equidistant threaded seats of the flange 3, three tools 1 according to the invention have previously been inserted as detailed above.

In order to allow the upward transition of the runner 2 until it contacts the flange 3, the cables 9 of the tools (only one is illustrated in the figure) are pulled down such that the hooks reach the inward configuration.

At this point, the tools 1 can be activated to support the runner by releasing the cables 9, since the release of the cable triggers the engaging element to reach the outward operative configuration.

The driving system of the tool according to the invention is operable, through the cable 9, from a remote location 30 which is outside a footprint of the runner 2. In this way, any operation under the runner 2 while it is suspended by the sling 18 is avoided.

Once the cables are released, thus activating the tools, connecting/disconnecting operations can be performed in safety.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What we claim is:

1. A tool for connecting/disconnecting a runner to/from a shaft assembly, the tool comprising:
   an elongated shape comprising a first portion and a second portion,
   the first portion comprising reversible connecting means arranged thereon to couple said tool to the shaft assembly,
   the second portion comprising an engaging-element and a driving system, said driving system comprising a reciprocatable latch disposed along said tool and connected to a cable operable from a remote location and adapted to activate said tool by positioning said engaging-element into an operative outward configuration to support the runner,
   said engaging-element comprises a couple of hooks hinged on said tool,
   said latch being adapted to cooperate with said couple of hooks in order to position said engaging-element into said operative outward configuration.

2. The tool of claim 1, wherein said reversible connecting means comprises a thread located on said first portion adapted to be coupled to a complementary receiving threaded seat located on the shaft assembly.

3. The tool of claim 1, wherein said couple of hooks share a common pivot, said couple of hooks being provided with torsion springs.

4. The tool of claim 3, wherein said torsion springs are adapted to maintain said couple of hooks in an idle inward configuration.

5. The tool of claim 1, wherein said latch is movable between a retracted position and an extended position.

6. The tool of claim 5, wherein said latch comprises an upper portion adapted to be inserted, when in said extended position, between said couple of hooks such to displace said couple of hooks into said operative outward configuration.

7. The tool of claim 5, wherein said latch comprises a reaction spring such that said latch is idle when in said extended position and is pulled down by means of said cable to reach said retracted position.

8. The tool of claim 6, wherein said upper portion is arrow-shaped.

* * * * *